(12) United States Patent
Tanaka et al.

(10) Patent No.: US 12,537,782 B2
(45) Date of Patent: Jan. 27, 2026

(54) MESSAGE COMMUNICATION METHOD AND COMPUTER-READABLE MEDIUM

(71) Applicant: ACCRETE, INC., Tokyo (JP)

(72) Inventors: Yusei Tanaka, Tokyo (JP); Keiichi Kamikawa, Tokyo (JP)

(73) Assignee: ACCRETE, INC., Tokyo (JP)

( * ) Notice: Subject to any disclaimer, the term of this patent is extended or adjusted under 35 U.S.C. 154(b) by 321 days.

(21) Appl. No.: 18/368,518

(22) Filed: Sep. 14, 2023

(65) Prior Publication Data
US 2024/0007425 A1  Jan. 4, 2024

Related U.S. Application Data

(63) Continuation of application No. PCT/JP2022/012376, filed on Mar. 17, 2022.

(30) Foreign Application Priority Data

Mar. 17, 2021  (JP) ................. 2021-044042

(51) Int. Cl.
*H04L 51/066* (2022.01)
*H04L 51/222* (2022.01)
*H04M 1/72436* (2021.01)

(52) U.S. Cl.
CPC .......... *H04L 51/066* (2013.01); *H04L 51/222* (2022.05); *H04M 1/72436* (2021.01)

(58) Field of Classification Search
CPC ..... H04L 51/066; H04L 51/222; H04L 51/18; H04L 67/06; H04L 51/58; H04M 1/72436;

(Continued)

(56) References Cited

U.S. PATENT DOCUMENTS 5,966,663 A * 10/1999 Gleason .............. H04M 3/5307
455/466
2004/0242203 A1  12/2004 Lipsanen et al.
(Continued)

FOREIGN PATENT DOCUMENTS

JP  2000-276414 A  10/2000
JP  2004-532593 A  10/2004
(Continued)

OTHER PUBLICATIONS

Hakak, Saqib, et al. "Preserving content integrity of digital holy Quran: Survey and open challenges." Ieee Access 5 (2017): 7305-7325. (Year: 2017).*

(Continued)

*Primary Examiner* — Sharad Rampuria
(74) *Attorney, Agent, or Firm* — Fitch, Even, Tabin & Flannery LLP

(57) ABSTRACT

Provided is a message communication method performed by a computer, comprising: receiving information at least a part of which is text-format information from a transmission source; determining whether a section having a specific feature is present in the text-format information; converting, when it is determined that a section having the feature is present, a part or an entirety of the text-format information into a message with a format in accordance with the feature and a communication protocol to be used for communication with a transmission destination; and transmitting the message to the transmission destination.

18 Claims, 10 Drawing Sheets

(58) Field of Classification Search
CPC ......... H04M 1/72451; H04M 1/72457; H04M 11/00; H04M 1/0214; H04M 1/724; H04M 1/72403; H04M 1/7243; H04M 1/72469; G06F 13/00; H04W 4/12; H04W 4/14
See application file for complete search history.

(56) References Cited

U.S. PATENT DOCUMENTS

| | | | |
|---|---|---|---|
| 2005/0233731 A1* | 10/2005 | Laumen | H04W 4/12 455/412.2 |
| 2008/0126491 A1 | 5/2008 | Portele et al. | |
| 2012/0166554 A1 | 6/2012 | Preece | |
| 2014/0155111 A1* | 6/2014 | Yang | G06F 3/04883 455/566 |

FOREIGN PATENT DOCUMENTS

| | | | |
|---|---|---|---|
| JP | 2006-018698 A | 1/2006 | |
| JP | 2006-309472 A | 11/2006 | |
| JP | 2007-537650 A | 12/2007 | |
| JP | 2009-031810 A | 2/2009 | |
| JP | 2014-228903 A | 12/2014 | |
| JP | 6736102 B1 | 8/2020 | |

OTHER PUBLICATIONS

International Search Report; Application No. PCT/JP2022/012376; May 24, 2022; 2 pages (English translation).

* cited by examiner

```
                                                                    ,-612
  Here is a job listing in X's area.
  _____
                                                                    ,-614
  > Y City  A Corporation  Computer Security Specialist
  _____
                                                                    ,-616
  Minimum payment p1 per hour; commuting expenses paid
                                                                    ,-618
  https://www.aaaaa.com/11111
                                                                    ,-620
  > Z City  B Corporation  Computer Software Engineer
                                                                    ,-622
  Minimum payment p2 per hour; commuting expenses paid
                                                                    ,-624
  https://www.bbbbb.com/22222
```

```
The observing meeting will be held as follows.
MM (month) DD (day) (Monday) at 14:00
@ X Building, Hall Y
```
— 712

```
https://www.zzzzz.com/maps/@[latitude],
[longitude]
```
— 714

MESSAGE COMMUNICATION METHOD AND COMPUTER-READABLE MEDIUM

CROSS-REFERENCE TO RELATED APPLICATIONS

This application is a continuation of International Application Serial No. PCT/JP2022/012376, filed Mar. 17, 2022, which claims priority to Japanese Patent Application No. 2021-044042, filed Mar. 17, 2021. The contents of these applications are incorporated herein by reference in their entirety.

BACKGROUND

Technical Field

The present disclosure relates to a message communication method and a non-transitory computer-readable medium storing a message communication program.

Background Art

Message communication services which transfer messages that may contain text-format information to communication terminals have been widely used. Message communication technologies include one that uses ordinary e-mail addresses as destinations, and one that uses telephone numbers or addresses equivalent to telephone numbers as destinations, for example. SMS (Short Messaging Service) is a representative example of the latter message communication. SMS can transfer character strings (which may include symbols) using telephone numbers as destinations.

Here, examples of an address equivalent to a telephone number include addresses as below. For instance, one example of this is an e-mail address given in association with a telephone number from a telecommunications carrier managing mobile phone numbers. This e-mail address is an e-mail address given uniquely in association with a telephone number. Another example of an address equivalent to a telephone number is an address used in a messaging system for an SNS (Social Networking Service) account uniquely associated with a mobile phone number. Besides those, an address equivalent to a telephone number may be a communication address that has a high ability to identify an individual like a telephone number. Such an address will herein be referred to as "a telephone number or telephone number-equivalent address" below.

The above-mentioned SMS cannot transfer rich text or multimedia contents containing still images, sounds, and moving images.

Incidentally, some types of message communication using telephone numbers or telephone number-equivalent addresses as destinations are capable of transferring rich text and multimedia contents. Examples of such message communication include MMS (Multimedia Messaging Service) and RCS (Rich Communication Services).

Other examples of the message communication using telephone numbers or telephone number-equivalent addresses as destinations also include a communication scheme involving using a dedicated application installed in a communication terminal, a communication scheme involving logging in to a predetermined website and using a dedicated user interface with a web browser, and so on.

In recent years, there are a variety of message communication schemes or forms that use telephone numbers or telephone number-equivalent addresses as destinations, as described above, due to the diversification of entities engaged in the telecommunications business. Moreover, in general, each communication scheme differs in communication protocol and also varies in the type of content that can be transmitted.

Therefore, the message communication using telephone numbers or telephone number-equivalent addresses as destinations may fail to deliver a message to a transmission destination due to the difference in communication protocol or the like.

In particular, in the case of simultaneous distribution from a company to individuals' communication terminals (so-called A2P (Application to Person) message distribution from a company's application), the message communication schemes available to the communication terminals of the transmission destinations are often not clear beforehand. This makes it difficult to determine which message communication scheme to select out of the plurality of message communication schemes given as options.

To address this, there is a technique that attempts to prevent a failure to deliver a message to transmission destinations as much as possible even in the case of simultaneous distribution or the like in which there are a plurality of message communication schemes that may be available to the communication terminals of the transmission destinations and accordingly there are a plurality of communication protocols for those types of message communication.

For example, there is technique for a message communication program that causes a computer to execute processes of: receiving one or more messages to be transmitted to an address of a transmission destination; selecting one communication protocol from among a plurality of communication protocols used by a plurality of telecommunications operator apparatuses; and, based on the messages, outputting a message to be sent to the address, the message complying with the selected communication protocol (see Japanese Patent No. 6736102 (Patent Literature 1), for example). In this technique disclosed in Patent Literature 1, the processes which the message communication program causes the computer to execute further include processes of: selecting one telecommunications operator apparatus among the plurality of telecommunications operator apparatuses; and requesting the selected telecommunications operator apparatus to transmit the output message such that the telecommunications operator apparatus will transmit the message to the address of the transmission destination in accordance with the selected communication protocol. The requesting process is repeated until the transmission succeeds or there is no more combination of a telecommunications operator apparatus and a communication protocol. The processes executed by the computer may also include a process of, if none of the one or more messages received complies with the selected communication protocol, generating a message complying with the communication protocol by using those messages (e.g., converting a rich-text message prepared for RCS into a text-only message in compliance with the SMS communication protocol).

Here, if one wants to ensure prevention of a failure to deliver a message to a transmission destination, it may be conceivable to, for example, render the information issued by the transmission source into a message consisting solely of character strings supported by SMS. Also, some transmission sources may have a need to create at least a part of information issued by the transmission source solely from text-format information without a rich format, for simplification of the message creation and the like.

However, a problem with rendering information issued by a transmission source into a message consisting solely of character strings supported by SMS or forming at least a part of that information solely from text-format information as described above is that, even if the communication terminal of a transmission destination supports, for example, a communication scheme capable of transferring rich text or the like, such as RCS, the ability to transfer rich text or the like cannot be fully utilized.

There are other conventional techniques for performing format conversion at the time of transferring information or the like.

For example, there is a technique as a method of transferring a message from a sender to a recipient, the method including the steps of: converting a message in an input representation form into a message in a predetermined transfer representation form dependent on the semantic content of the message; and converting the message in the transfer representation form into a message in an output representation form (see Published Japanese Translation of PCT International Application No. 2007-537650 (Patent Literature 2), for example). In this technique disclosed in Patent Literature 2, a semantic message analysis is executed in at least one of the step of converting a message in the input representation form into a message in the transfer representation form and the step of converting the message in the transfer representation form into a message in the output representation form. For example, a message containing a date can be compressed into a transfer representation based on the semantic content. Specifically, if the semantic analysis concludes that the message contains information about a promise, the message can be converted into a transfer representation such that the transfer representation contains the date as well. Also, if the semantic analysis concludes that the message contains a trip report, the dates are omitted in the transfer representation. This makes it possible to compress information, thus requiring less bandwidth and storage space, and transfer messages with a lower transfer ability.

Of techniques involving a kind of format conversion, there is also a technique focusing on the presence of a particular content in input information (see Japanese Patent Application Publication No. 2009-31810 (Patent Literature 3), for example). In this technique disclosed Patent Literature 3, an operator task support system for improving an operator's work efficiency performs speech recognition on the content of a call to convert it into text data and, when it is displayed on a screen, highlights keywords designated in advance. The highlighting is implemented by, for example, putting the keyword in predetermined brackets but may be implemented by changing the keyword's color, font type, size, or the like or underlining, bolding, or italicizing the keyword.

All of these conventional techniques are such that, even if the communication terminal of a transmission destination supports, for example, a communication scheme capable of transferring rich text or the like, such as RCS, the ability to transfer rich text or the like is not fully utilized in message communication when information issued by the transmission source is rendered into a message consisting solely of character strings supported by SMS or at least a part of that information is formed solely from text-format information.

SUMMARY

An object of the technique of the disclosure is to provide a message communication method that is performed by a computer, including receiving information at least a part of which is text-format information from a transmission source, and that makes it possible to transmit a message in accordance with a feature in the information and a form of communication with a transmission destination.

The technique of the disclosure provides a message communication method performed by a computer, comprising: receiving information at least a part of which is text-format information from a transmission source; determining whether a section having a specific feature is present in the text-format information; converting, when it is determined that a section having the feature is present, a part or an entirety of the text-format information into a message with a format in accordance with the feature and a communication protocol to be used for communication with a transmission destination; and transmitting the message to the transmission destination.

With the technique of the disclosure, it is possible to provide a message communication method that is performed by a computer, including receiving information at least a part of which is text-format information from a transmission source, and that makes it possible to transmit a message in accordance with a feature in the information and a form of communication with a transmission destination.

DETAILED DESCRIPTION

The present specification and drawings disclose a message communication program for causing a computer to execute a message communication method and a non-transitory computer-readable medium storing the message communication program.

In embodiments of the disclosure, a "transmission source" refers to an entity or a person that issues information at least a part of which is text-format information and attempts to transfer a message having a content in accordance with the issued information to a transmission destination by using a message communication program, and is typically an apparatus of a client company utilizing the message communication program, but is not limited this and may be any entity or person.

In the embodiments of the disclosure, the "transmission destination" refers to a target to which the message communication program transfers information containing a message, and is typically an apparatus of a telecommunications operator connected through a communication network to a communication terminal of a recipient intended to be the final receiver of the information from the transmission source mentioned above, but is not limited to this and may be any entity or person. For example, the "transmission destination" may be the communication terminal of the recipient. One example of the telecommunications operator is a carrier in mobile communication (MNO (Mobile Network Operator)). Another example of the telecommunications operator is an MVNO (Mobile Virtual Network Operator) utilizing this carrier's communication line. Other examples of the telecommunications operator include companies that are engaged in messaging services provided in association with SNS and the like, and companies that provide communication terminals and OSs and are engaged in messaging services as a function of the OS.

In the embodiments of the disclosure, the message communication program mediates message communication between the transmission source and the transmission destination.

The embodiments of the disclosure will be described below with reference to the drawings.

<Overview of Process>

Figure 1:
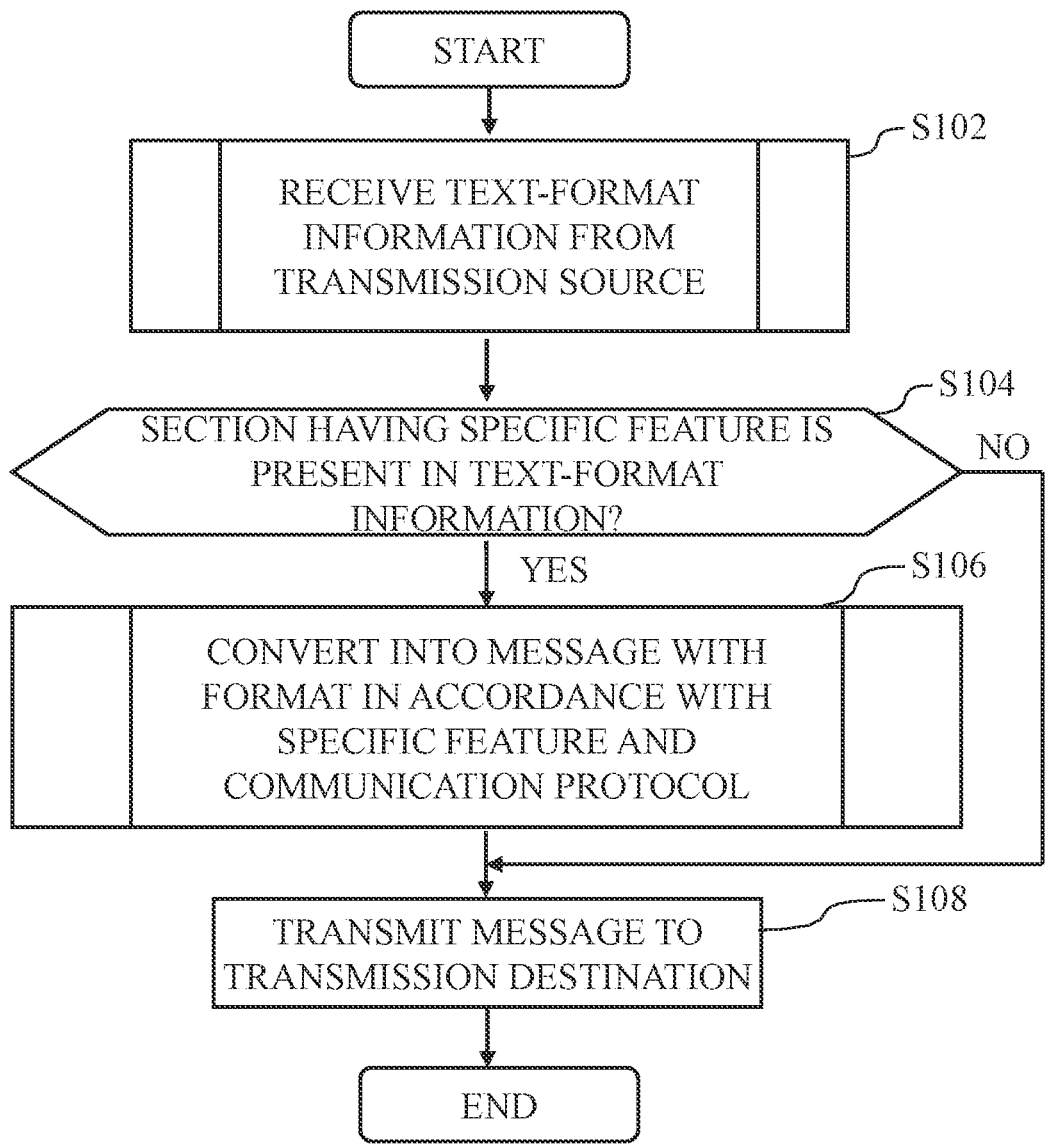
FIG. 1 is a flowchart illustrating an example of a process in an embodiment of the technique of the disclosure.

FIG. 1 is a flowchart illustrating an overview of an example of a process in one embodiment.

The order of execution of the steps in the operation flows disclosed herein and in drawings may be changed as long as there is no inconsistency. Also, a plurality of steps may be executed simultaneously. Each step may be implemented by executing a program stored in a memory. Also, a part of each step may be implemented by an operating system or hardware.

In step S102, the message communication program receives information at least a part of which is text-format information from a transmission source.

In step S104, it is determined whether a section having a specific feature is present in the text-format information.

If the result of that determination in step S104 is YES, that is, if it is determined that a section having a specific feature is present in the text-format information, then in step S106, a part or the entirety of the text-format information is converted into a message with a format in accordance with the feature and a communication protocol to be used for communication with the transmission destination.

Subsequently, in step S108, the message is transmitted to the transmission destination.

If, on the other hand, the result of the determination in step S104 is NO, that is, if it is determined that a section having a specific feature is not present in the text-format information, the processing moves to step S108 described above, and the processing of this step is executed.

This ends the process.

Note that examples of the specific feature will be described later with reference to FIGS. 4A to 8B.

<Processing of Receiving Text-Format Information>

Figure 2:
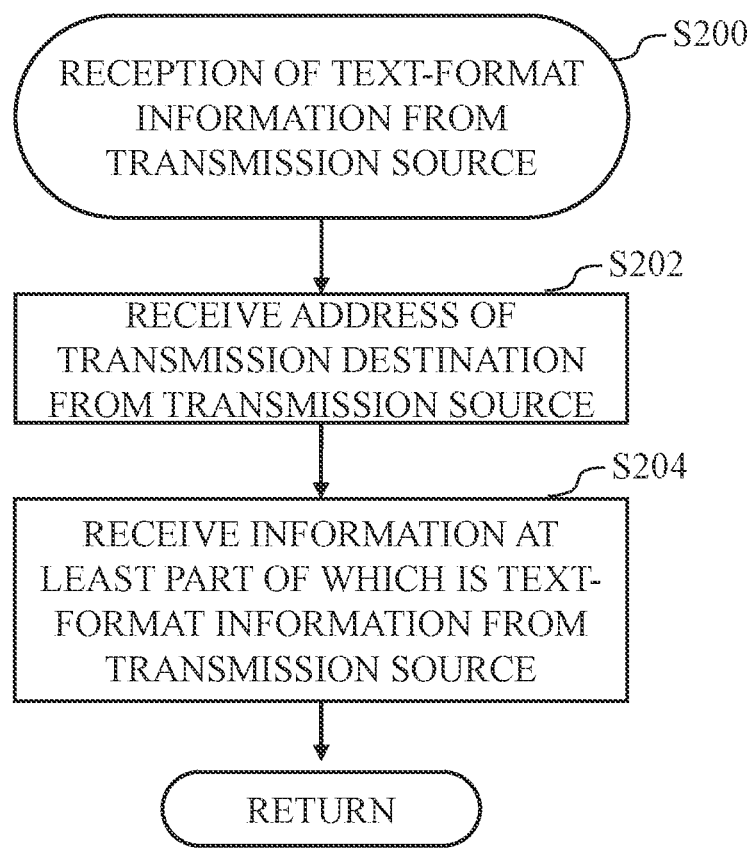
FIG. 2 is a flowchart illustrating an example of processing (subroutine) of receiving information at least a part of which is text-format information from a transmission source in an embodiment.

FIG. 2 is a flowchart illustrating an example of the processing of receiving the information at least a part of which is text-format information from the transmission source in step S102 described above in a further embodiment (S200, which is a subroutine).

In step S202, the message communication program receives an address of the transmission destination from the transmission source. This address of the transmission destination may be a telephone number or telephone number-equivalent address of the transmission destination.

In the subsequent step S204, the message communication program receives information at least a part of which is text-format information from the transmission source. This text-format information may contain one or more messages.

This ends the processing of S200, which is a subroutine.

<Processing of Converting Text-Format Information into Message with Format in Accordance with Communication Protocol>

Figure 3:
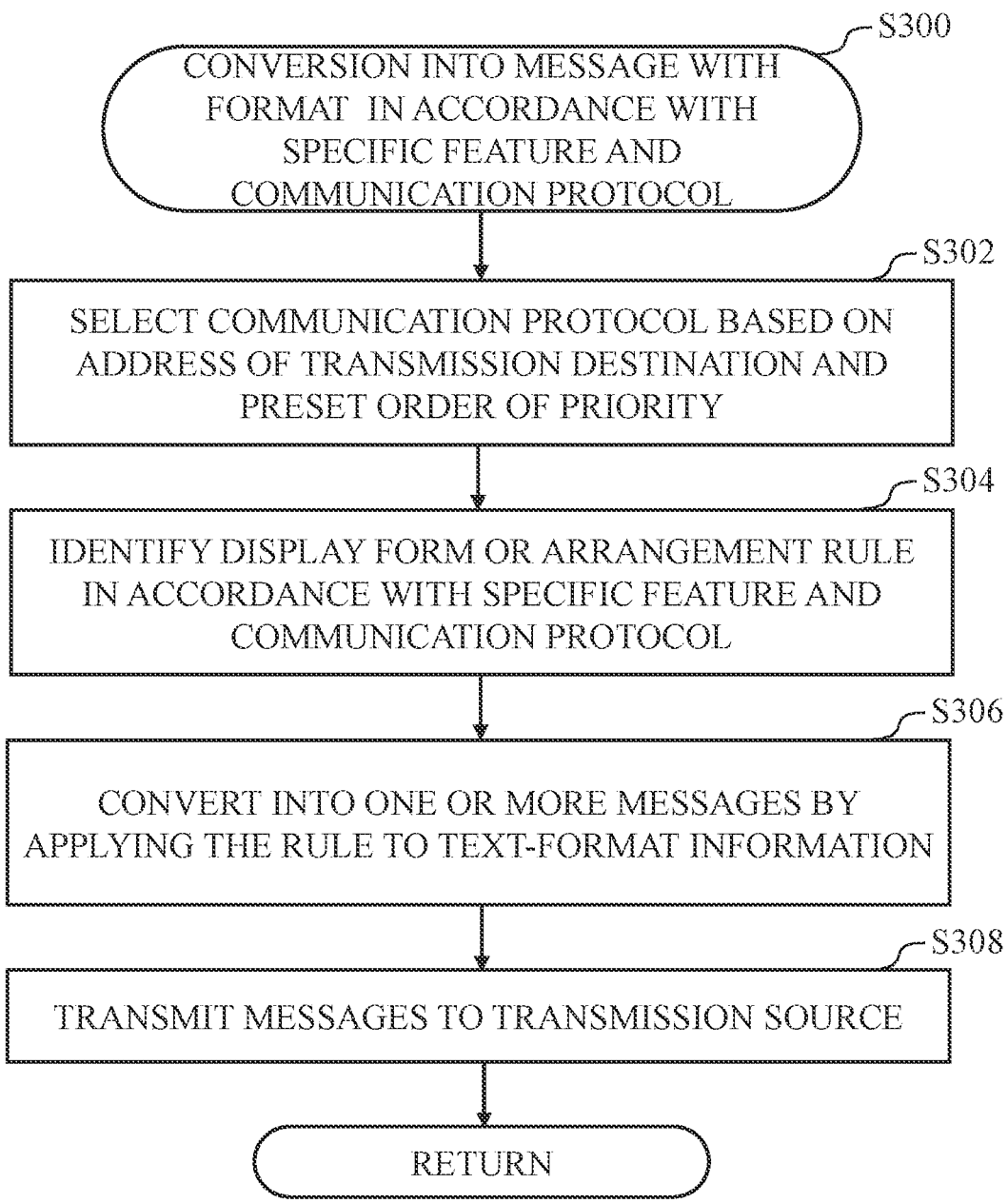
FIG. 3 is a flowchart illustrating an example of processing (subroutine) of converting a part or the entirety of the text-format information into a message with a format in accordance with a specific feature in the text-format information and a communication protocol to be used for communication with a transmission destination in an embodiment.

FIG. 3 is a flowchart illustrating an example of the processing of converting a part or the entirety of the text-format information into a message with the format in accordance with the specific feature in the text-format information and the communication protocol to be used for communication with the transmission destination in step S106 described above in a further embodiment (S300, which is a subroutine).

In step S302, the message communication program selects the communication protocol to be used for communication with the transmission destination. In this embodiment, the communication protocol is selected based on the address of the transmission destination which the message communication program received from the transmission source in step S202 described above and a preset order of priority.

Now, a specific example of selecting the communication protocol based on the address of the transmission destination and the preset order of priority in this step S302 will be described.

The message communication program refers to a communication protocol DB (database) 912 illustrated in FIG. 9 to be mentioned later. In this communication protocol DB 912, information on a communication protocol with which message communication succeeded in the past is stored for each entry of a transmission destination address. Alternatively, in the communication protocol DB 912, information on a combination of a communication protocol and a telecommunications operator apparatus with which message communication succeeded in the past may be stored for each entry of a transmission destination address. Also, if communication fails, the communication protocol DB 912 may record information on the communication protocol or information on the combination of the communication protocol and the telecommunications operator apparatus in that event.

Here, the communication protocol is, for example, a communication protocol for SMS, MMS, or RCS mentioned earlier, but is not limited to these.

The message communication program also refers to a priority order storage unit 914 illustrated in FIG. 9 to be mentioned later. In this priority order storage unit 914, information on the order of priority for selecting a communication protocol, i.e., information on which communication protocol to preferentially select, is stored. This order of priority may be a preset order of priority. Also, the order of priority in the priority order storage unit 914 may be settable or changeable based on an instruction from the transmission source. Moreover, the priority order storage unit 914 may have information on the order of priority of telecommunications operators in addition to the information on the order of priority of communication protocols.

In one embodiment, in step S302, the message communication program searches the communication protocol DB 912 based on the address of the transmission destination and identifies a communication protocol with which message communication with the address succeeded in the past. When a single communication protocol is identified, that communication protocol is selected. When a plurality of communication protocols are identified as successful communication protocols for the address, the message communication program refers to the priority order storage unit 914 and selects the communication protocol with the highest priority among the plurality of communication protocols. When no successful communication protocol is identified for the address, the message communication program also refers to the priority order storage unit 914 and selects the communication protocol with the highest priority among the communication protocols stored in it. At this time, if the communication protocol DB 912 has information on a communication protocol with which communication failed in the past as described above, the message communication program may try to avoid selecting the failed communication protocol as much as possible.

Since the message communication program refers to the communication protocol DB 912 and preferentially selects a communication protocol with which message communication succeeded in the past, it is possible to increase the possibility of successful message communication.

Note that, if the communication protocol DB 912 has information on a combination of a communication protocol and a telecommunications operator apparatus with which message communication succeeded in the past for each entry of a transmission destination address as described above, then, when selecting a communication protocol, the message communication program can additionally select the corresponding telecommunications operator apparatus as well.

In step S304, after selecting a communication protocol in step S302, the message communication program identifies a rule on a display form or arrangement to be applied to the text-format information in accordance with the specific feature in the text-format information and the selected communication protocol. Examples of such a rule will be described later with reference to FIGS. 4A to 8B.

The rule may include a preset display form or arrangement rule. Also, the rule may include a display form or arrangement rule selected by the transmission source.

Subsequently, in step S306, the message communication program applies the rule identified in step S304 to the text-format information to convert a part or the entirety of the text-format information into one or more messages with a format in accordance with the particular feature in the text-format information and the selected communication protocol. Examples of such conversion will be described later with reference to FIGS. 4A to 8B as well.

The conversion is typically conversion into a message with a format containing a larger amount of information than the amount of information in the format of the text-format information, but is not limited to such conversion.

Subsequently, in step S308, the message communication program transmits the one or more messages obtained in step S306 to the transmission source. By transmitting the messages to the transmission source before transmitting them to the transmission destination as described above, the transmission source can display the messages on the transmission source apparatus, that is, present a preview display.

This ends the processing of S300, which is a subroutine.

In another embodiment of the subroutine S300, for each of a plurality of communication protocols, a message after conversion may be prepared in advance by conversion in accordance with the communication protocol. Specifically, in step S302, instead of searching the communication protocol DB 912 based on the transmission destination address, the communication protocols stored in the priority order storage unit 914 may be sequentially selected and, for each communication protocol, a message after conversion in accordance with the communication protocol may be prepared by repeating conversion into a message with a format in accordance with the specific feature and the communication protocol through steps S304 and S306. In this case, the message communication program can thereafter search the communication protocol DB 912 based on the transmission destination address and also refer to the priority order storage unit 914 and select the communication protocol corresponding to the transmission destination address, and then associate the message prepared in advance by the conversion in accordance with the communication protocol with the transmission destination address.

In still another embodiment of the subroutine S300, in step S302, a communication protocol may be selected without the address of the transmission destination taken into account. In that case, the communication protocol DB 912 does not have be present.

<Examples of Specific Feature, Display Form or Arrangement Rule, and Conversion Applying Rule>

Examples of the specific feature, examples of the display form or arrangement rule, and examples of the conversion applying the rule will be described below with reference to FIGS. 4A to 8B.

<Matter Common to Examples of FIGS. 4A to 8B: Categories of Lines in Text-Format Information>

In the examples illustrated in FIGS. 4A to 8B, categories of the lines in the text-format information may be used in order to indicate the specific feature in the text-format information. Thus, the categories will be described first.

These categories represent categorization of the lines in the text-format information into the following four types of lines, for example. Specifically, they are "title line", "description (detailed explanation) line", "URL line", and "message line".

Of these, "title line" is a line describing a title or heading for at least a part of the text-format information, and "description (detailed explanation) line" is a line having a description corresponding to this title or heading. Also, "URL line" is a line consisting of a URL designating a resource on the Internet. Moreover, "message line" is a line in which various kinds of information intended to be transmitted to transmission destinations can be described, and is a line corresponding to none of "title line", "description (detailed explanation) line", or "URL line" described above. Here, as will be described later, "URL line" may contain "a description representing a geographical location", and "message line" may contain "a description representing options" and also "a date, a time, or a combination thereof".

In one embodiment, the message communication program categorizes the lines in the text-format information in order to determine whether a section having a specific feature is present in the text-format information in step S104 described above. This categorization uses the above-described four categories, for example.

In one embodiment, the definitions described in (a) to (d) below are set in advance for those four categories, for example. Setting such definitions can facilitate the execution of the categorization. The definitions are shared with the transmission source and can be referred to when the transmission source creates text-format information.

(a) Title Line
   A line appearing at the first part of the text-format information and having no full stop in Japanese (circle) or period (.) at the end, or
   A line starting with a specific symbol (e.g., > or, *) and having no full stop in Japanese (circle) or period (.) at the end (b) Description (Detailed Explanation) Line
   A line that follows a title line (including the case of following a title line after another description line) and is neither a title line nor a URL line (c) URL Line
   A line consisting of a URL designating a resource on the Internet (c-1) URL Line in which a Description Representing a Geographical Location is Present
   When a URL line consists of a URL designating a latitude and a longitude on the earth, this line is handled as a URL line in which "a description representing a geographical location" is present.

(d) Message Line
   A line in the text-format information that is none of (a) to (c) described above (d-1) Message Line in which a Description Representing Options is Present
   When a plurality of message lines having a colon (:) as a delimiter are present in a continuous manner, these lines are handled as a message line in which "a description representing options" is present.

(d-2) Message Line in which a Date, a Time, or a Combination Thereof is Present
   When a date, a time, or a combination thereof is recognized in a message line from its or their notations, this line is handled as a message line in which "a date, a time, or a combination thereof" is present.

With the definitions of the categories in this one embodiment, the message communication program can sequentially determine which categories the lines forming text-format information belong to on a line-by-line basis, and does not need to determine the categories by analyzing the whole text-format information.

Also, with the definitions of the categories in this one embodiment, the message communication program can determine which categories the lines forming text-format information belong to without performing a semantic analysis on the text-format information. Likewise, the message communication program can determine the presence of "a description representing a geographical location", the presence of "a description representing options", and the presence of "a date, a time, or a combination thereof" without performing a semantic analysis on the text-format information. For example, when a line forming text-format information is the above-described "line appearing at the first part of the text-format information and having no full stop in Japanese (circle) or period (.) at the end", it is a notational feature in the text-format information, and whether that feature is present or absent can be determined without performing a semantic analysis. Further, with the above-described category definition (a) in this one embodiment, when a line is a "line appearing at the first part of the text-format information and having no full stop in Japanese (circle) or period (.) at the end" as defined, that line can be categorized as a "title line". Also, when text-format information has "a description representing options", it is a content feature in the text-format information but, according to this one embodiment, that can be determined based on the notational feature "a plurality of message lines having a colon (:) as a delimiter are present in a continuous manner" in the text-format information, without performing a semantic analysis.

The definitions of the categories in the above one embodiment are mere examples. For example, the message communication program may determine which categories the lines forming text-format information belong to by analyzing the whole text-format information. For example, the message communication program may determine which categories the lines forming text-format information belong to by performing a semantic analysis on the text-format information. Likewise, the message communication program may determine, for example, the presence of "a description representing a geographical location", the presence of "a description representing options", and the presence of "a date, a time, or a combination thereof" by performing a semantic analysis on the text-format information.

<Matter Common to Examples of FIGS. 4A to 8B: Communication Protocol>

Regarding the communication protocol, cases where the communication protocol to be used in communication with the transmission destination in the examples illustrated in FIGS. 4A to 8B is the RCS communication protocol will be exemplarily described. It goes without saying, however, that the communication protocol is not limited to this one.

Figure 4A:
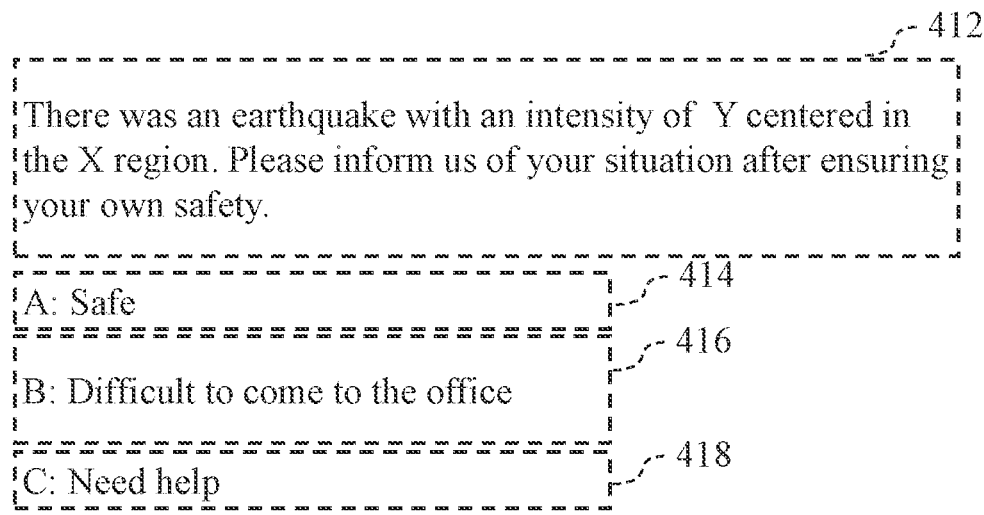
FIGS. 4A and 4B are diagrams illustrating an example of format conversion in an embodiment when a description representing options is present in the text-format information, with FIG. 4A illustrating the text-format information and FIG. 4B illustrating a message after the conversion.
Figure 4B:
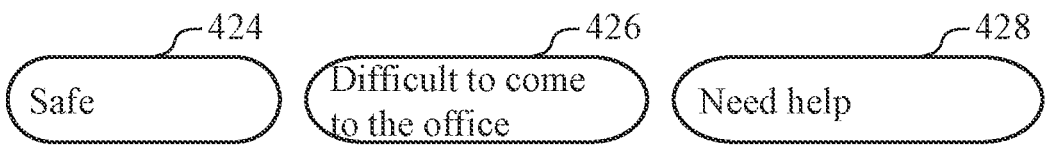

<Example Illustrated in FIGS. 4A and 4B>

Next, one specific example of the specific feature, the display form or arrangement rule, and the conversion applying the rule will be described with reference to FIG. 4 (FIGS. 4A and 4B).

FIG. 4 illustrates an example of a case where a description representing options is present in the text-format information. In this example, the specific feature in the text-format information includes the presence of a description representing options. The specific feature also includes the presence of a colon (:), which is a specific symbol, as a feature indicating the presence of a description representing options. Moreover, the example of the display form or arrangement rule in FIG. 4 is to display each option such that, in response to a selecting operation (e.g., a tapping operation or a clicking operation on the screen of a terminal), the selected option is returned to the transmission source.

Looking at FIG. 4A while referring to the categories of the lines in the text-format information and the example definitions of those categories described above, each line is categorized as below:
   Line in a section 412: Message line (Reason: The line in the section 412 does not correspond to any of the definitions (a) to (c) described above, and therefore corresponds to "(d) Message Line")

Lines in sections 414 to 418: Message lines in which "a description representing options" is present (Reason: The lines in the sections 414 to 418 do not correspond to any of the definitions (a) to (c) described above, and therefore correspond to "(d) Message Line". Moreover, these lines also correspond to "when a plurality of message lines having a colon (:) as a delimiter are present in a continuous manner", and therefore correspond to "(d-1) Message line in which a description representing options is present".)

According to one embodiment, as a result of the above-described categorization of the lines in the text-format information illustrated in FIG. 4A, the message communication program determines in step S104 described above that the text-format information has a specific feature indicating that "a description representing options" is present.

Moreover, in step S304 described above, the message communication program identifies the display form or arrangement rule to be applied to the text-format information in accordance with the specific feature and the selected communication protocol (e.g., RCS communication protocol). In this case, an example of the rule is "to display each option such that, in response to a selecting operation (e.g., a tapping operation or a clicking operation on the screen of a terminal), the selected option is returned to the transmission source", as described above.

Subsequently, in step S306, the message communication program applies the rule to the text-format information illustrated in FIG. 4A to convert the text-format information into the message illustrated in FIG. 4B, which has a format in accordance with the specific feature and the selected communication protocol and has sections 422 to 428. Here, the sections 424 to 428 in FIG. 4B are options corresponding to the sections 414 to 418 in FIG. 4A, and each option is such that, in response to a selecting operation (e.g., a tapping operation or a clicking operation on the screen of a terminal), the selected option is returned to the transmission source.

According to this embodiment, in message communication, the information issued by the transmission source is rendered into a message formed solely of character strings supported by SMS to thereby ensure prevention of a failure to deliver the message to the transmission destination, and when the transmission destination supports a communication scheme capable of transferring rich text or the like, such as RCS, the ability to transfer such rich text or the like can be fully utilized.

Also, even when the transmission source is intended to transfer rich text or the like, at least a part of the information issued by the transmission source can be formed solely of text-format information using no rich format. In this way, the message creation by the transmission source can be simpler.

Figure 5A:
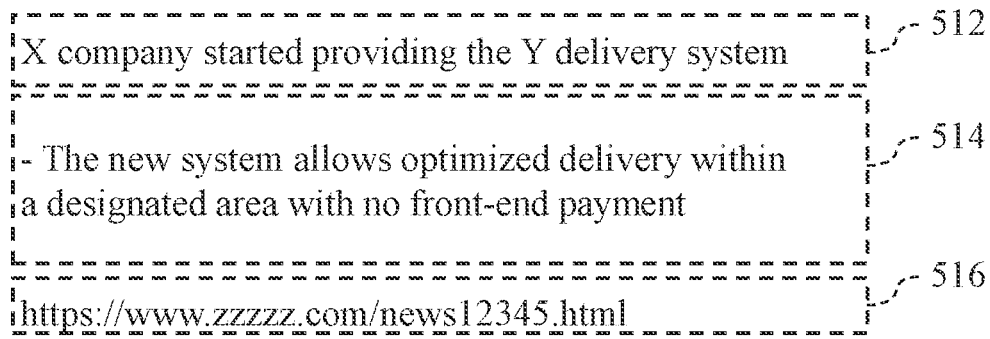
FIGS. 5A and 5B are diagrams illustrating an example of format conversion in an embodiment when a combination of a title or heading and a description corresponding thereto and a URL are present in the text-format information, with FIG. 5A illustrating the text-format information and FIG. 5B illustrating a message after the conversion.
Figure 5B:
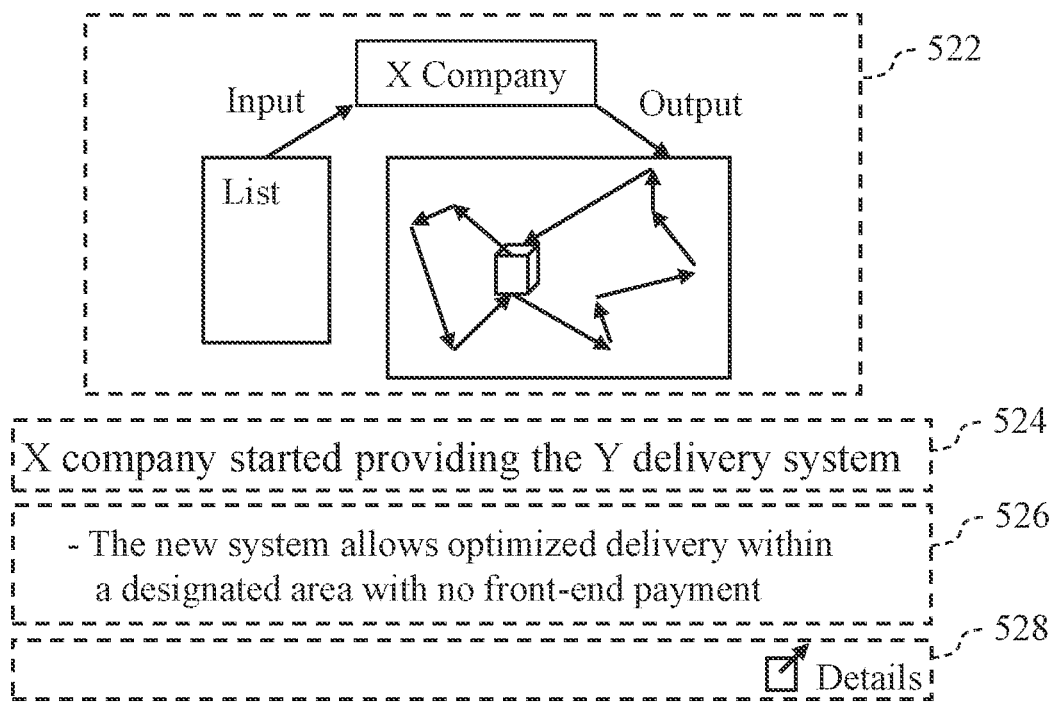

<Example Illustrated in FIGS. 5A and 5B>

FIG. 5 (FIGS. 5A and 5B) illustrates an example of a case where a combination of a title or heading and a corresponding description is present in the text-format information and additionally a URL is present. In this example, the specific feature in the text-format information includes the presence of a combination of a title or heading and a corresponding description and the presence of a URL. Moreover, the example of the display form or arrangement rule in FIG. 5 includes: displaying a title or heading with larger characters than the corresponding description; if an image is present at a linked URL, loading and displaying the image; and displaying a link to the linked URL.

Looking at FIG. 5A while referring to the categories of the lines in the text-format information and the example definitions of those categories described above, each line is categorized as below.

Line in a section 512: Title line (Reason: The line in the section 512 corresponds to the definition (a) described above "A line appearing at the first part of the text-format information and having no full stop in Japanese (circle) or period (.) at the end.)

Line in a section 514: Description (detailed explanation) line (Reason: The line in the section 514 corresponds to the definition (b) described above "A line that follows a title line (including the case of following a title line after another description line) and is neither a title line nor a URL line". Here, note that "-" in the top part of the line in the section 514 does not correspond to the "specific symbol" in the definition (a) described above.)

Line in a section 516: URL line (Reason: The line in the section 516 corresponds to the definition (c) described above "A line consisting of a URL designating a resource on the Internet".)

According to one embodiment, as a result of the above-described categorization of the lines in the text-format information illustrated in FIG. 5A, the message communication program determines in step S104 described above that the text-format information has a specific feature indicating that "a combination of a title or heading and a corresponding description" is present and a specific feature indicating that a "URL" is present.

Moreover, in step S304 described above, the message communication program identifies the display form or arrangement rule to be applied to the text-format information in accordance with the specific features and the selected communication protocol (e.g., RCS communication protocol). In this case, as described above, the example of the rule includes: "displaying a title or heading with larger characters than the corresponding description"; "if an image is present at a linked URL, loading and displaying the image"; and "displaying a link to the linked URL".

Subsequently, in step S306, the message communication program applies the rule to the text-format information illustrated in FIG. 5A to convert the text-format information into the message illustrated in FIG. 5B, which has a format in accordance with the specific features and the selected communication protocol and has sections 522 to 528. Here, the sections 524 and 526 in FIG. 5B correspond to the sections 512 (title line) and 514 (description line) in FIG. 5A, respectively, and the section 524 is displayed with larger characters than the section 526. Also, the section 522 in FIG. 5B is an image present at the linked URL in the section 516 in FIG. 5A, and the section 528 is the link to the linked URL.

Figures 6A, 6B:
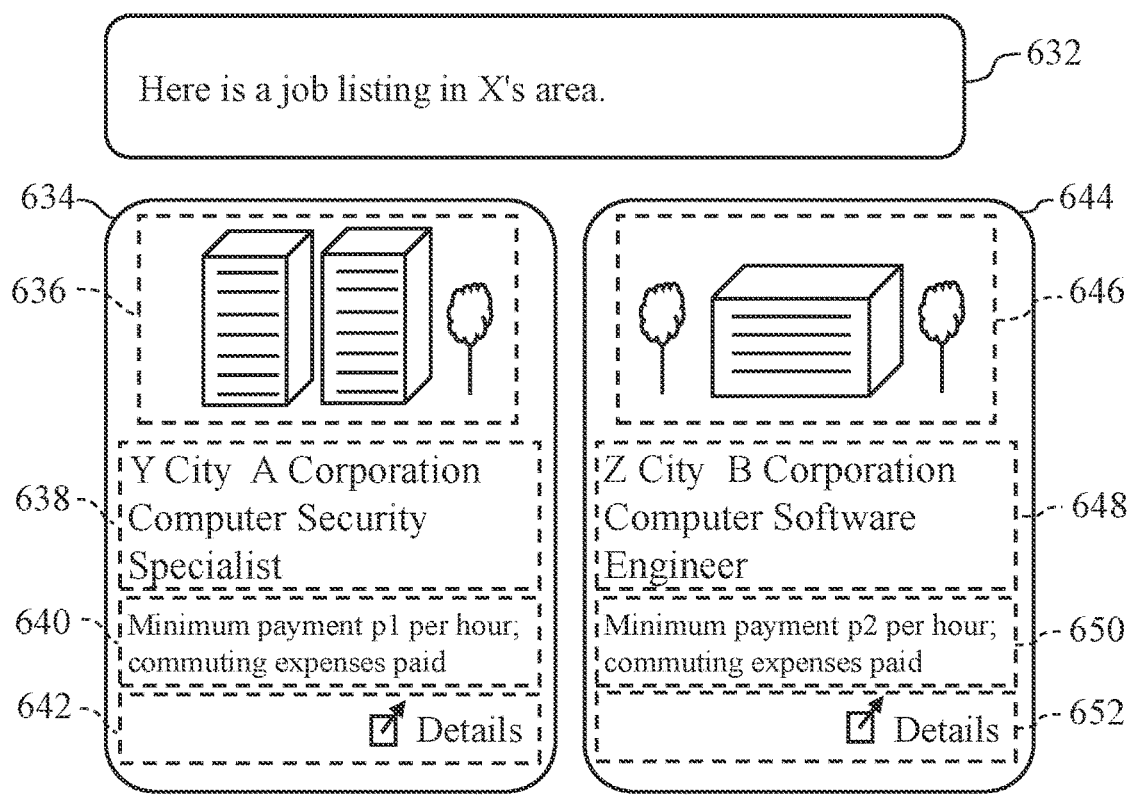
FIGS. 6A and 6B are diagrams illustrating another example of format conversion in an embodiment when a combination of a title or heading and a description corresponding thereto and a URL are present in the text-format information, with FIG. 6A illustrating the text-format information and FIG. 6B illustrating a message after the conversion.

<Example Illustrated in FIGS. 6A and 6B>

FIG. 6 (FIGS. 6A and 6B) illustrates an example of a case where a plurality of combinations of a title or heading and a corresponding description are present in the text-format information and additionally URLs are present. In this example, the specific feature in the text-format information includes the presence of combinations of a title or heading and a corresponding description and the presence of URLs. Moreover, the example of the display form or arrangement rule in FIG. 6 includes: displaying a title or heading with larger characters than the corresponding description; if a plurality of combinations of a title or heading and a corresponding description are present, the individual combinations are arranged side by side; if an image is present at a linked URL, loading and displaying the image; and displaying a link to the linked URL.

Looking at FIG. 6A while referring to the categories of the lines in the text-format information and the example definitions of those categories described above, each line is categorized as below.

Line in a section 612: Message line (Reason: The line in the section 612 does not correspond to any of the definitions (a) to (c) described above, and therefore corresponds to "(d) Message Line")

Lines in sections 614 and 620: Title lines (Reason: The lines in the sections 614 and 620 correspond to the definition (a) described above "A line starting with a specific symbol (e.g., >, *) and having no full stop in Japanese (circle) or period (.) at the end.)

Lines in sections 616 and 622: Description (detailed explanation) lines (Reason: The lines in the sections 616 and 622 correspond to the definition (b) described above "A line that follows a title line (including the case of following a title line after another description line) and are neither a title line nor a URL line".)

Lines in sections 618 and 624: URL lines (Reason: The lines in the sections 618 and 624 correspond to the definition (c) described above "A line consisting of a URL designating a resource on the Internet".)

According to one embodiment, as a result of the above-described categorization of the lines in the text-format information illustrated in FIG. 6A, the message communication program determines in step S104 described above that the text-format information has a specific feature indicating that "a combination of a title or heading and a corresponding description" is present and a specific feature indicating that a "URL" is present.

Moreover, in step S304 described above, the message communication program identifies the display form or arrangement rule to be applied to the text-format information in accordance with the specific features and the selected communication protocol (e.g., RCS communication protocol). In this case, as described above, the example of the rule includes: "displaying a title or heading with larger characters than the corresponding description"; "if a plurality of combinations of a title or heading and a corresponding description are present, the individual combinations are arranged side by side"; "if an image is present at a linked URL, loading and displaying the image"; and "displaying a link to the linked URL".

Subsequently, in step S306, the message communication program applies the rule to the text-format information illustrated in FIG. 6A to convert the text-format information into the message illustrated in FIG. 6B, which has a format in accordance with the specific features and the selected communication protocol and has sections 632, 636 to 642, and 646 to 652. Here, the sections 638 and 648 and the sections 640 and 650 in FIG. 6B correspond to the sections 614 and 620 (both are title lines) and the sections 616 and 622 (both are description lines) in FIG. 6A, respectively, and the sections 638 and 648 are displayed with larger characters than the sections 640 and 650. Also, a section 634 including one of the combinations of a title or heading and a corresponding description and a section 644 including the other combination are arranged side by side. Moreover, the sections 636 and 646 in FIG. 6B are images present at the linked URLs in the sections 618 and 624 in FIG. 6A, and the sections 642 and 652 are the links to those linked URLs.

Figures 7A, 7B:
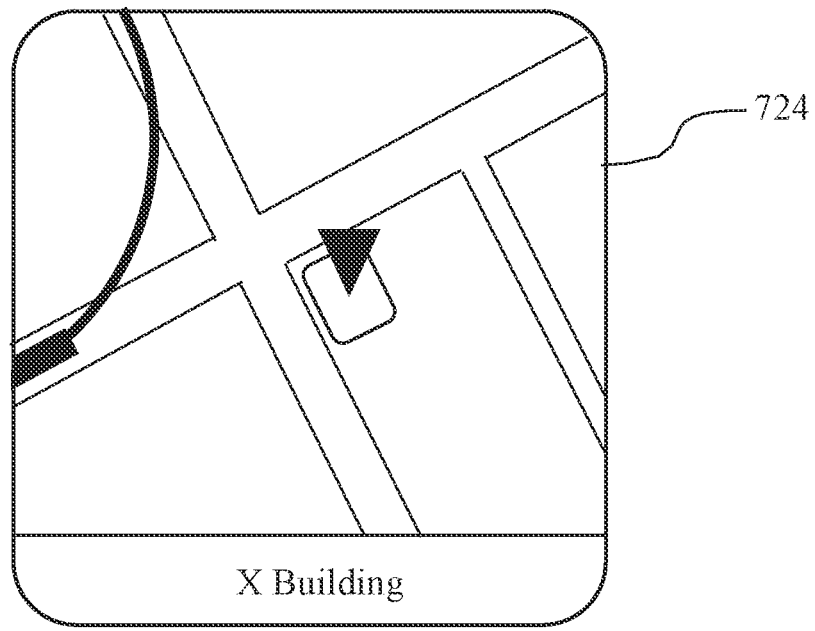
FIGS. 7A and 7B are diagrams illustrating an example of format conversion in an embodiment when a description in the form of a URL representing a geographical location is present in the text-format information, with FIG. 7A illustrating the text-format information and FIG. 7B illustrating a message after the conversion.

<Example Illustrated in FIGS. 7A and 7B>

FIG. 7 (FIGS. 7A and 7B) illustrates an example of a case where a description representing a geographical location and a date, a time, or a combination thereof are present in the text-format information. In this example, the specific feature in the text-format information includes the presence of a description representing a geographical location (An example of a case where the specific feature also includes the presence of a date, a time, or a combination thereof will be presented in association with FIGS. 8A and 8B). Moreover, the example of the display form or arrangement rule in FIG. 7 includes, when a description representing a geographical location consists of a URL designating a latitude and a longitude on the earth, loading a map containing the corresponding geographical location and displaying the map and the location.

Looking at FIG. 7A while referring to the categories of the lines in the text-format information and the example definitions of those categories described above, each line is categorized as below.

Line in a section 712: Message line (Reason: The line in the section 712 does not correspond to any of the definitions (a) to (c) described above, and therefore corresponds to "(d) Message Line")

Line in a section 714: URL line in which a "description representing a geographical location" is present (Reason: The line in the section 714 corresponds to the definition (c) described above "A line consisting of a URL designating a resource on the Internet". Moreover, this line also corresponds to "when a URL line consists of a URL designating a latitude and a longitude on the earth", and therefore corresponds to "(c-1) URL line in which a description representing a geographical location is present".)

According to one embodiment, as a result of the above-described categorization of the lines in the text-format information illustrated in FIG. 7A, the message communication program determines in step S104 described above that the text-format information has a specific feature indicating that "a description representing a geographical location" is present.

Moreover, in step S304 described above, the message communication program identifies the display form or arrangement rule to be applied to the text-format information in accordance with the specific feature and the selected communication protocol (e.g., RCS communication protocol). In this case, as described above, the example of the rule includes "when a description representing a geographical location consists of a URL designating a latitude and a longitude on the earth, loading a map containing the corresponding geographical location and displaying the map and the location.

Subsequently, in step S306, the message communication program applies the rule to the text-format information illustrated in FIG. 7A to convert the text-format information into the message illustrated in FIG. 7B, which has a format in accordance with the specific feature and the selected communication protocol and has sections 722 and 724. Here, the section 724 in FIG. 7B is an image of a map present at the linked URL in the section 714 in FIG. 7A, and a display of the corresponding location.

Figure 8A:
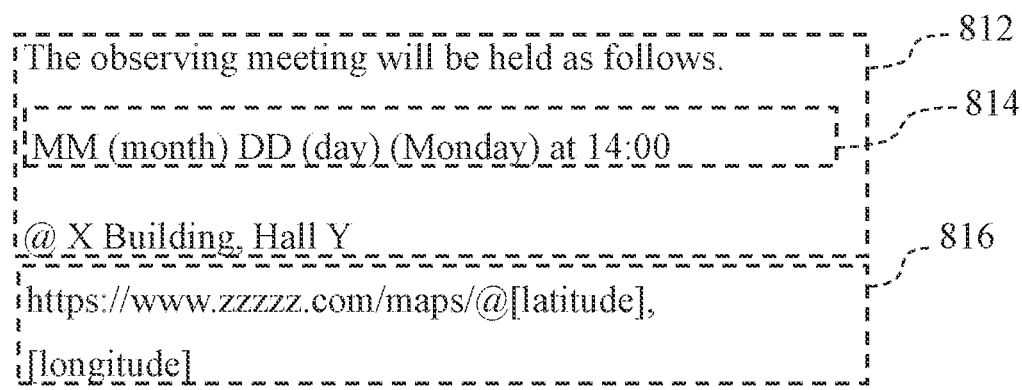
FIGS. 8A and 8B are diagrams illustrating an example of format conversion in an embodiment when a combination of a date and a time and a description in the form of a URL representing a geographical location are present in the text-format information, with FIG. 8A illustrating the text-format information and FIG. 8B illustrating a message after the conversion.
Figure 8B:
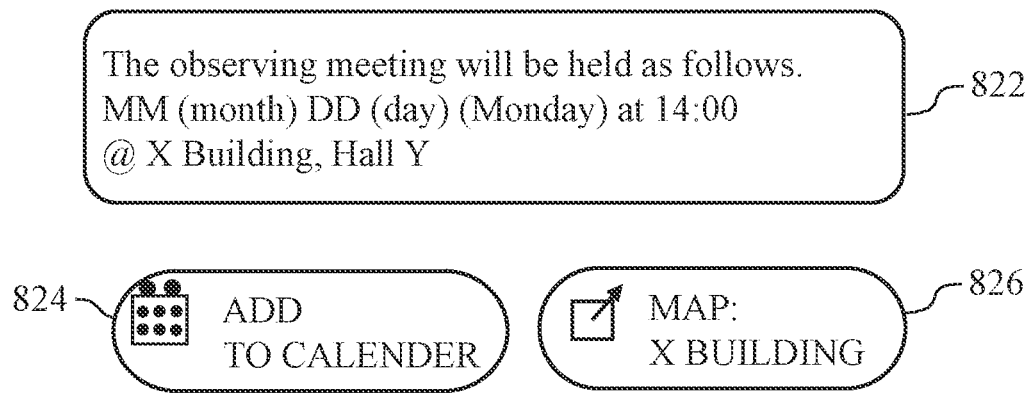

<Example Illustrated in FIGS. 8A and 8B>

FIG. 8 (FIGS. 8A and 8B) illustrates an example of a case where, like the example illustrated in FIG. 7, a description representing a geographical location and a date, a time, or a combination thereof are present in the text-format information. The text-format information illustrated in FIG. 8A is the same as the text-format information illustrated in FIG. 7A. In this example of FIG. 8, the specific feature in the text-format information includes the presence of a date, a time, or a combination thereof and the presence of a description representing a geographical location. Moreover, the example of the display form or arrangement rule in this FIG. 8 includes: displaying an option to add a date and time corresponding to the date, time, or combination thereof to a calendar; and when the description representing a geographical location consists of a URL designating a latitude and a longitude on the earth, displaying an option to load a map containing the corresponding geographical location.

Looking at FIG. 8A while referring to the categories of the lines in the text-format information and the example definitions of those categories described above, each line is categorized as below.

Line in a section 812: Message line (Reason: The line in the section 812 does not correspond to any of the definitions (a) to (c) described above, and therefore corresponds to "(d) Message Line")

Line in a section 814: Message line in which "a date, a time, or a combination thereof" is present (Reason: The line in the section 814 does not correspond to any of the definitions (a) to (c) described above, and therefore corresponds to "(d) Message Line". Moreover, this line also corresponds to "when a date, a time, or a combination thereof is recognized in a message line from its or their notations", and therefore corresponds to "(d-2) Message line in which a date, a time, or a combination thereof is present".)

Line in a section 816: URL line in which a "description representing a geographical location" is present (Reason: The line in the section 816 corresponds to the definition (c) described above "A line consisting of a URL designating a resource on the Internet". Moreover, this line also corresponds to "when a URL line consists of a URL designating a latitude and a longitude on the earth", and therefore corresponds to "(c-1) URL line in which a description representing a geographical location is present".)

According to one embodiment, as a result of the above-described categorization of the lines in the text-format information illustrated in FIG. 8A, the message communication program determines in step S104 described above that the text-format information has a specific feature indicating that "a date, a time, or a combination thereof" is present and a specific feature indicating that "a description representing a geographical location" is present.

Moreover, in step S304 described above, the message communication program identifies the display form or arrangement rule to be applied to the text-format information in accordance with the specific features and the selected communication protocol (e.g., RCS communication protocol). Moreover, as described above, the example of the rule includes: "displaying an option to add a date and time corresponding to a date, a time, or a combination thereof to a calendar"; and "when a description representing a geographical location consists of a URL designating a latitude and a longitude on the earth, displaying an option to load a map containing the corresponding geographical location".

Subsequently, in step S306, the message communication program applies the rule to the text-format information illustrated in FIG. 8A to convert the text-format information into the message illustrated in FIG. 8B, which has a format in accordance with the specific features and the selected communication protocol and has sections 822 to 826. Here, the section 824 in FIG. 8B is a display of an option to add the date and time in the section 814 in FIG. 8A to a calendar.

Also, the section 826 in FIG. 8B is a display of an option to load an image of a map present at the linked URL in the section 816 in FIG. 8A.

In the examples illustrated in FIGS. 5 to 8, the message communication program in an embodiment can achieve advantageous effects similar to those described with reference to the example illustrated in FIG. 4.

Note that the display form or arrangement rule to be applied to the text-format information may include a rule selected by the transmission source, as mentioned earlier, and an example of such a choice is as follows. Specifically, "when a description representing a geographical location consists of a URL designating a latitude and a longitude on the earth", a choice can be made between "loading a map containing the corresponding geographical location and displaying the map and the location", which is an example of the rule described in relation to FIG. 7, and "displaying an option to load a map containing the corresponding geographical location", which is an example of the rule described in relation to FIG. 8. By making such a choice, the message communication program can provide the transmission source with a wide range of freedom for the conversion rule.

<Functional Block Diagram and Hardware Configuration>

Figure 9:
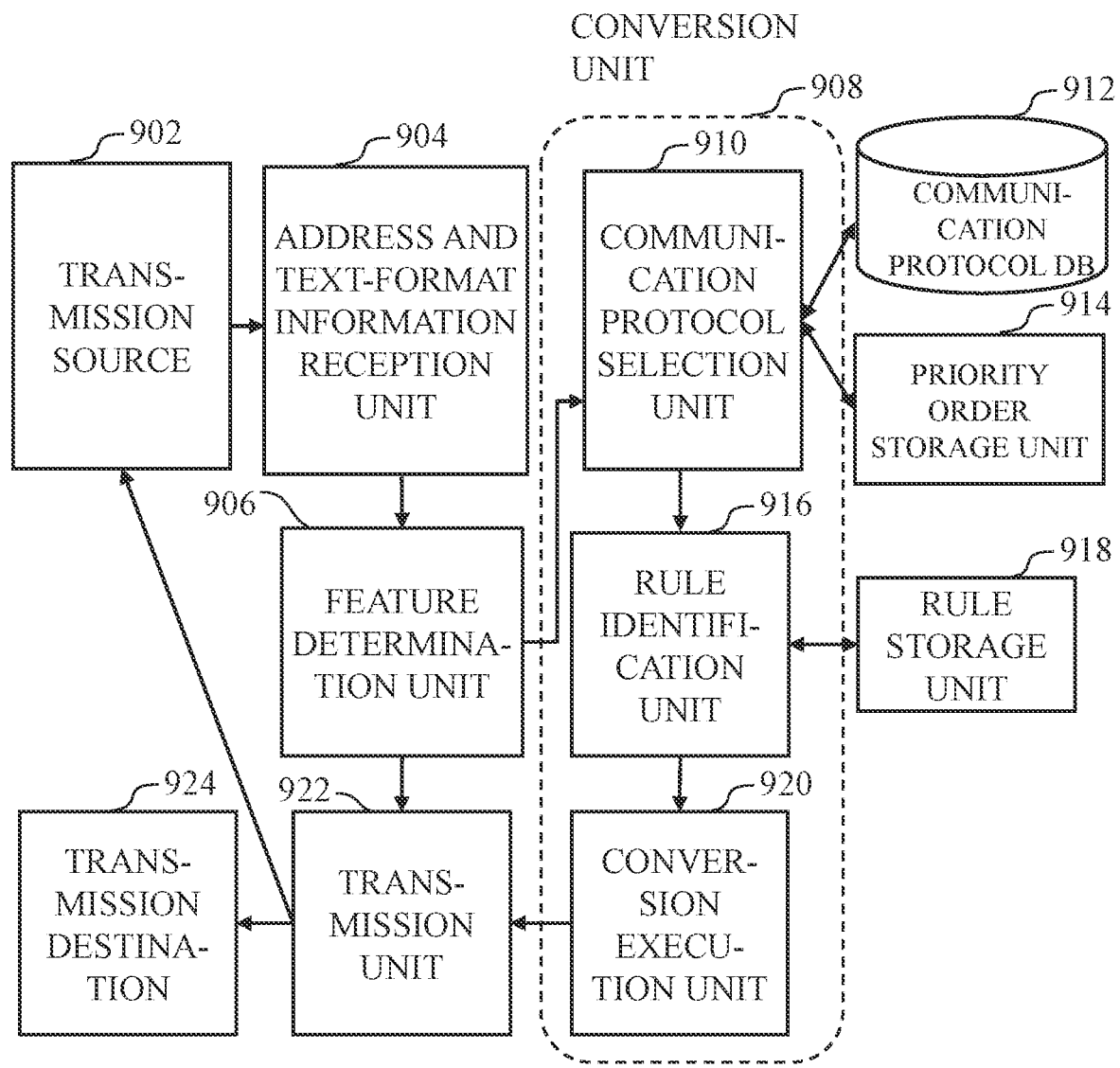
FIG. 9 is a functional block diagram in an embodiment.

FIG. 9 is a functional block diagram illustrating a configuration of an apparatus that executes the message communication program in an embodiment.

The configuration of this apparatus has an address and text-format information reception unit 904 that receives, from a transmission source 902, information at least a part of which is text-format information, and a telephone number or telephone number-equivalent address of a transmission destination as an address of the transmission destination. This configuration also has: a feature determination unit 906 that determines whether a section having a specific feature is present in the text-format information; a conversion unit 908 that converts a part or the entirety of the text-format information into a message with a format in accordance with the feature and a communication protocol to be used for communication with the transmission destination; and a transmission unit 922 that transmits the message to the transmission source 902 and a transmission destination 924. Of these, the conversion unit 908 further includes: a communication protocol selection unit 910 that selects the communication protocol to be used for communication with the transmission destination; a rule identification unit 916 that identifies the display form or arrangement rule to be applied to the text-format information; and a conversion execution unit 920 that executes conversion applying the rule.

The communication protocol selection unit 910 is connected to the communication protocol DB 912 and the priority order storage unit 914, which have been described in detail. Also, the rule identification unit 916 is connected to a rule storage unit 918 storing the display form or arrangement rules exemplarily illustrated in relation to FIGS. 4A to 8B.

The function of each unit is apparent to those skilled in the art from the description of the message communication program given herein, and further description is therefore omitted.

Figure 10:
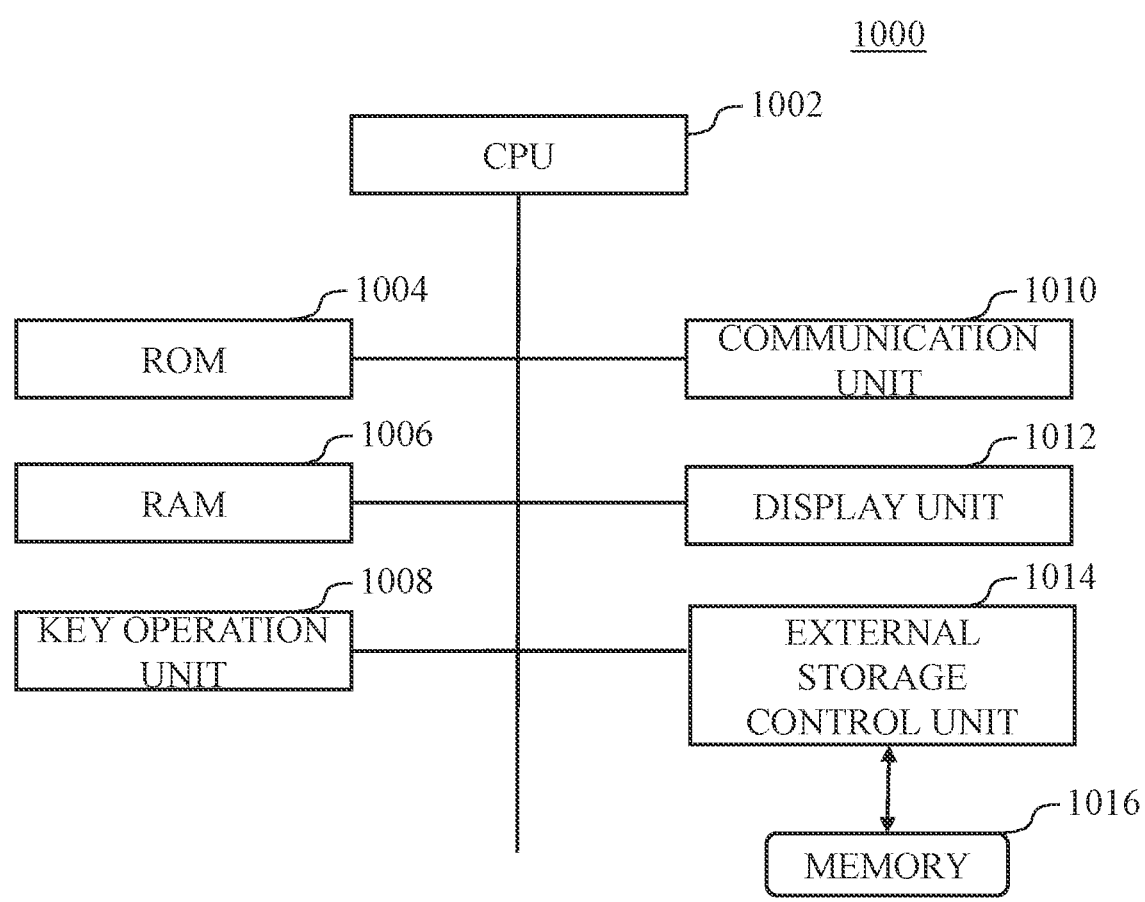
FIG. 10 is a diagram illustrating a hardware configuration in an embodiment.

FIG. 10 is a diagram of a hardware configuration of an apparatus 1000 that executes the message communication program in an embodiment. The apparatus 1000 has a CPU 1002, a ROM 1004, a RAM 1006, a key operation unit 1008, a communication unit 1010, a display unit 1012, and an external storage control unit 1014. The apparatus 1000 is capable of operating with the message communication program stored in a memory 1016 and loaded by the external storage control unit 1014. The message communication program can also be stored in the ROM 1004 and the RAM 1006. The apparatus 1000 operates under control of the CPU 1002, which executes the message communication program.

While several embodiments of the invention were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. A message communication method performed by a computer, comprising:
   receiving information at least a part of which is text-format information from a transmission source;
   determining whether a section having a specific feature is present in the text-format information;
   converting, when it is determined that a section having the feature is present,
   a part or an entirety of the text-format information into a message with a format in accordance with the feature and
   a communication protocol to be used for communication with a transmission destination; and
   transmitting the message to the transmission destination, wherein
   the converting includes applying to the text-format information a rule on a display form or arrangement of information in the text-format information; and
   the feature includes presence of a specific character,
   a specific symbol, or
   a combination thereof in the text-format information.

2. The message communication method according to claim 1, wherein the converting includes converting into a message with a format having a larger amount of information than an amount of information in a format of the text-format information.

3. The message communication method according to claim 1, wherein the rule includes a preset rule on the display form or arrangement.

4. The message communication method according to claim 1, wherein the rule includes a rule selected by the transmission source on the display form or arrangement.

5. The message communication method according to claim 1, wherein the converting includes transmitting the message to the transmission source so as to display the message on an apparatus of the transmission source before transmitting the message to the transmission destination.

6. The message communication method according to claim 1, wherein the converting includes selecting the communication protocol based on a preset order of priority.

7. The message communication method according to claim 1, wherein the receiving includes receiving at least a telephone number or telephone number-equivalent address of the transmission destination as an address of the transmission destination from the transmission source.

8. The message communication method according to claim 7, wherein the converting includes selecting the communication protocol based on the address.

9. The message communication method according to claim 1, wherein
   the text-format information contains one or more messages, and
   the message to be transmitted to the transmission destination includes one or more messages.

10. The message communication method according to claim 1, wherein the specific feature is one or more preset features.

11. The message communication method according to claim 1, wherein the specific feature includes a content feature of the text-format information.

12. The message communication method according to claim 1, wherein the specific feature includes a notational feature of the text-format information.

13. The message communication method according to claim 11, wherein the content feature includes presence of a URL in the text-format information.

14. The message communication method according to claim 11, wherein the content feature includes presence of a description representing a geographical location in the text-format information.

15. A non-transitory computer-readable medium storing a program that causes a computer to execute the message communication method according to claim 1.

16. A message communication method performed by a computer, comprising:
   receiving information at least a part of which is text-format information from a transmission source;
   determining whether a section having a specific feature is present in the text-format information;
   converting, when it is determined that a section having the feature is present,
   a part or an entirety of the text-format information into a message with a format in accordance with the feature and a communication protocol to be used for communication with a transmission destination; and
   transmitting the message to the transmission destination, wherein
   the determining includes processing which is based on categories of lines in the text-format information and in accordance with presence of a plurality of predetermined items among the categories in the text-format information; and
   the feature includes presence of a specific character,
   a specific symbol, or
   a combination thereof in the text-format information.

17. A message communication method performed by a computer, comprising:
   receiving information at least a part of which is text-format information from a transmission source;
   determining whether a section having a specific feature is present in the text-format information;
   converting, when it is determined that a section having the feature is present,
   a part or an entirety of the text-format information into a message with a format in accordance with the feature and
   a communication protocol to be used for communication with a transmission destination; and
   transmitting the message to the transmission destination, wherein
   the converting includes preparing, for each of a plurality of the communication protocols, the message after the converting in accordance with the communication protocol; and
   the feature includes presence of a specific character,
   a specific symbol, or
   a combination thereof in the text-format information.

18. A message communication method performed by a computer, comprising:
   receiving information at least a part of which is text-format information from a transmission source;

determining whether a section having a specific feature is present in the text-format information;
converting, when it is determined that a section having the feature is present,
a part or an entirety of the text-format information into a message with a format in accordance with the feature and
a communication protocol to be used for communication with a transmission destination; and
transmitting the message to the transmission destination, wherein
the feature includes at least one of
   presence of a description representing options in the text-format information,
   presence of a combination of a title or heading and a description corresponding to the title or heading in the text-format information, or
   presence of a date, a time, or a combination thereof in the text-format information; and
the feature includes presence of a specific character,
a specific symbol, or
a combination thereof in the text-format information.

\* \* \* \* \*